(No Model.)
H. A. HUGHES.
PROCESS OF STRIPPING AND CLEANING SUGAR CANE.
No. 354,510. Patented Dec. 14, 1886.
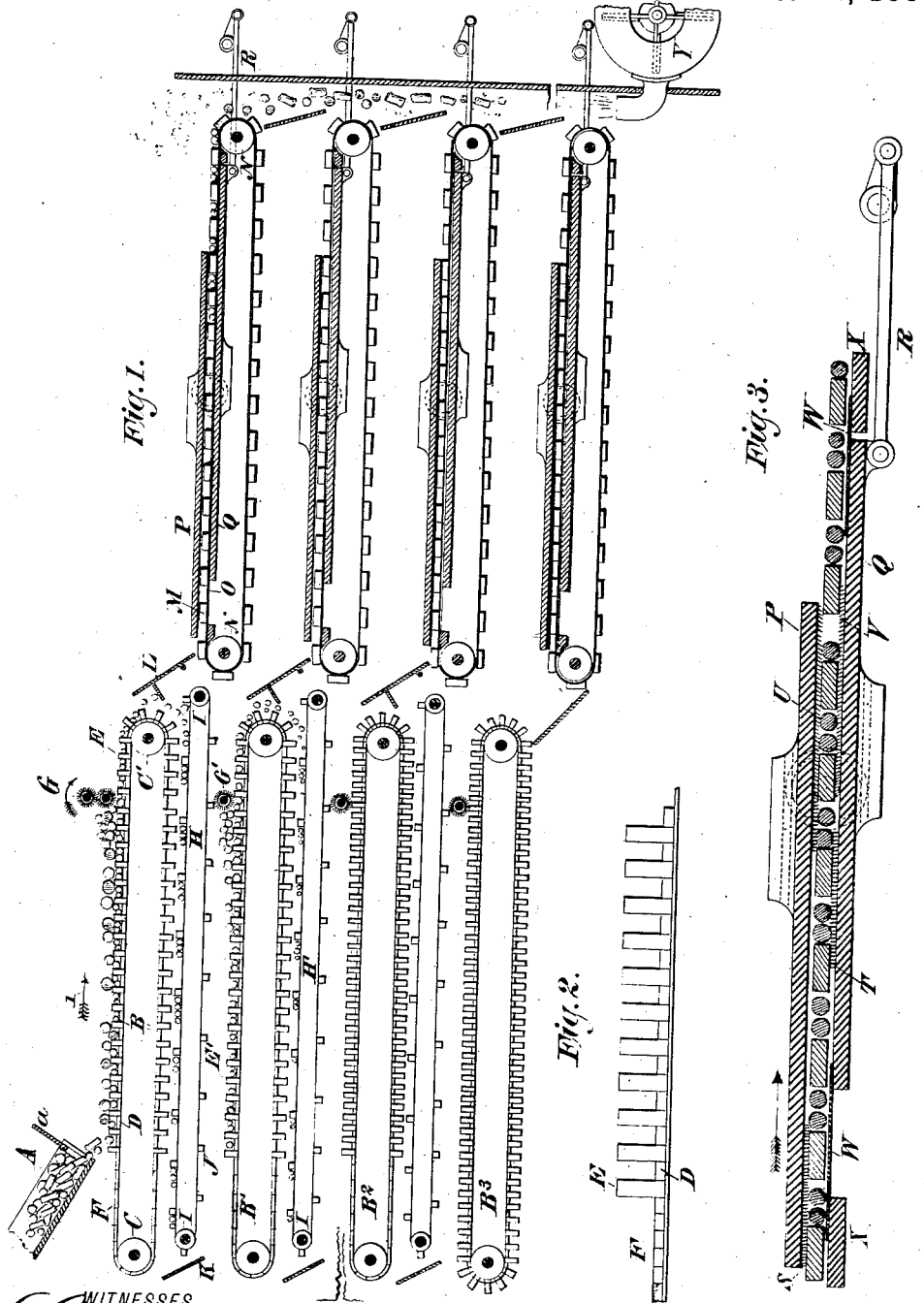

UNITED STATES PATENT OFFICE.

HENRY A. HUGHES, OF RIO GRANDE, NEW JERSEY.

PROCESS OF STRIPPING AND CLEANING SUGAR-CANE.

SPECIFICATION forming part of Letters Patent No. 354,510, dated December 14, 1886.

Application filed February 6, 1886. Serial No. 101,107. (No model.)

*To all whom it may concern:*

Be it known that I, HENRY A. HUGHES, of Rio Grande, Cape May county, New Jersey, have invented a new and useful Process of Stripping and Cleaning Sugar-Cane, of which the following is a specification.

My invention relates more particularly to the treatment of sorghum-cane. I have discovered that the dark color and bitter taste of diffusion-juice obtained from sorghum-cane is due, chiefly, to the steeping of the leaves and sheaths, and that it can be avoided by stripping the cane. The effect of the leaves and sheaths in the diffusers is also to increase the amount of water to be evaporated by thirty-three per cent., while the dark color of the juice resulting decreases the market value of the sirups by one-half.

In order to strip the cane effectually, I have devised a new process, which is the subject of my present application.

In the accompanying drawings I show certain instrumentalities which I prefer to employ for carrying my process into practical effect.
I do not limit myself to the particular instrumentalities here represented, because I may use other means to accomplish the same purposes; neither do I herein claim the said instrumentalities, for the reason that they enter into the construction of a machine which will be made the subject of a separate application for Letters Patent hereafter to be filed by me, in which application the said instrumentalities and the combinations involved in their construction and arrangement will be fully described and claimed, of which notice to the public is hereby given. Only so much of the aforesaid instrumentalities is here shown as is requisite to the understanding of a practical mode of carrying my aforesaid process into effect.

Figure 1 of the said drawings represents a side elevation and partial section of the assorting-aprons and stripping and brushing devices. Fig. 2 shows the arrangement of separating slats and partitions on one of the assorting-aprons. Fig. 3 is a longitudinal section of so much of one of the stripping devices as is necessary to show the mode of treatment of the cane by the stripping pins and brushes.
Similar letters of reference indicate like parts.

I first cut the cane, by any suitable means, into short lengths of about four inches. The pieces so cut are conveyed into an elevated receptacle, whence they pass to the inclined chute A. At the lower end of this chute is a gate, a, which is intermittently opened to allow of the outward delivery of the pieces.

Beneath the chute A is a sizing or assorting endless apron, B, which passes over revolving rollers C C', whereby the upper surface of the apron is caused to travel in the direction of the arrow 1. Upon the apron are attached spacing-slats D, and between these slats are secured vertical partitions E. The slats and partitions are fastened to the apron at their lower sides only, so that they easily pass around the rollers C C'. The partitions E extend transversely across the apron, but are not present over its entire area, being omitted between the spacing-slats at the part F of said apron, which at such part has a substantially smooth surface.

As is well known, the cane-stalk varies in thickness, and hence the pieces which fall upon the apron B from the chute are of various diameters. The object of the apron B is to separate from the mixed pieces all those exceeding, say, one and one-half inch in diameter. To this end the spacing-slats D are made of such width as to render the intervals between the partitions E equal to one and one-half inch; hence such pieces of the cane as are less than one and one-half inch in diameter will fall between the said partitions E, but all pieces of larger diameter will rest upon the upper sides of said partitions.

Above the apron B is disposed a rotating brush-wheel or pair of brush-wheels, G. This wheel or wheels is revolved in such direction as that when the large pieces resting on the partitions E are by the forward movement of the apron carried up to them (the wheel or wheels) the said wheel will throw the large pieces back. Meanwhile the small pieces which enter between the partitions E are carried over the roller C', and finally fall upon the endless apron H, which moves over rollers I in the reverse direction to that of the apron B. On the apron H are widely-spaced partitions J, between which the pieces of cane are received. The object of the apron H is to carry the cane rearward and to cause it to fall upon an inclined plane, K, by which it is delivered upon an endless traveling apron, B', similar in all respects to the apron B, except that the transverse partitions E' thereon are separated by smaller intervals than the partitions E on the apron B—say for a distance of one and three-eighths inch. The consequence then is, that all pieces of a less diameter than one and three-eighths inch will enter the spaces between the partitions E', while all pieces of larger diameter will be brushed back by the rotating brush-wheel G' upon the tops of the partitions E', as before. The small pieces between the partitions E' are now carried over the roller and caused to fall upon an endless traveling apron, H', in all respects similar to the apron H, and thence fall upon another apron, B², similar to the aprons B B', except that the partitions thereon are still more narrowly spaced. There may be any number of aprons, as B B' × × B² B³, thus successively arranged, each apron causing the separation of all the pieces exceeding a certain limit in diameter, until finally only small pieces of minimum diameter fall upon the last and lowest apron, B³. Returning now to apron B, the large pieces thrown back by the brushes G remain upon the tops of the partitions E until the smooth portion F of said apron reaches the brushes, when the pieces fall upon said portion. Meanwhile said smooth portion has traveled beneath the mouth of the chute A, and during the time of its movement the gate $a$ is closed, so that no pieces of cane are delivered thereon. When the said part F comes over the apron-roller C', then a slide, L, (which hitherto has been kept raised, and hence away from the apron B,) falls, so that the pieces can pass from the apron upon this slide.

Referring next to Fig. 3 and the devices shown at the right-hand side of Fig. 1, at M are slats supported at their ends by endless chains or bands O, which pass over rollers N. There are consequently open spaces between said slats, and the slat apron so formed moves slowly in the same direction as the apron B. The depth of the slats (vertical height) in the several slat aprons shown depends upon the diameter of the assorted pieces of cane delivered to each slat apron. The depth of the slats in each slat apron should be slightly less than the diameter of the pieces of cane supplied to it.

Disposed respectively above and below each slat apron are broad plates or planes P and Q. To one of these plates is connected a mechanism for causing it to reciprocate in a longitudinal direction—as, for example, the crank and pitman R. By any suitable means—as, for example, racks and pinion, indicated by dotted lines, as in Fig. 3—the movement of one plate is transmitted to the other, so that while one plate travels forward the other moves backward, and vice versa.

On the under side of the upper plate are attached sharp points or pins S. Similar pins are secured to the upper side of the lower plate at T. On the under side of the upper plate in rear of the pins are brushes U, and similar opposing brushes, V, are fastened to the upper side of the lower plate.

In order to prevent the cane from dropping through the open spaces between the slats M when the lower plate, Q, is reciprocated, thin plates W are secured at each end of said plate Q, which plates W slide over the fixed bars X. As the plates P and Q are rapidly reciprocated back and forth the sharp pins S and T rub over and under the pieces of cane which rest between the slats M, and as the depth of these slats is slightly less than the diameter of the cane, it follows that the pins can enter for a short distance into the sheath upon the cane and so tear off the same. The cane is meanwhile being slowly carried forward by the movement of the slats; but as this motion is much slower than that of the plates P and Q the pieces are forcibly brought against the sides of the slats, which thus support and hold them in opposition to the rubbing action. As the cane passes from between the pins S and T it encounters the brushes U and V, which complete the removal of the sheath, or of any adhering fragments, and polish the surface. Finally, the pieces fall off the ends of the slat aprons into a chute which communicates with a blower, Y, or other means of creating an air-blast, which drives off the dust and fragments.

The stripping and brushing devices arranged in rear of each apron B × × B³ are alike, except that in each successive slat apron the depth of the slats corresponds to the decreasing intervals between the partitions E E', &c., this of course being necessary, because the diameter of the separated pieces of cane constantly diminishes, and hence the stripping pins and brushes must be placed gradually nearer together in order effectually to operate upon the surfaces of the pieces.

Referring now to the last assorting-apron, B³, it will be observed that this differs from the preceding aprons B B' × × B² in having no smooth portion, like the part F of apron B. This is not necessary, inasmuch as all the pieces upon the apron are thrown off upon the inclined chute Z, which remains always down, and from which the pieces pass to the last scratching and brushing apparatus, whence they are delivered into the exit-chute with those from the scratching and brushing devices above. Means (not necessary to show here) are provided whereby the delivery of pieces of cane from the apron H to the apron B' is checked during the passage of the smooth portion of the apron B' beneath the plane K, and I also arrange other mechanism for driving the aprons and operating the slides L and the blower Y, which is not herein shown or described.

Having now set forth a practical means of carrying my process into effect, I proceed to define my said process, which has for its object the separating and stripping of the sections of cane in order to remove leaves and sheaths therefrom preparatory to diffusing; and the said process consists, first, in dividing the cane into suitable lengths, then separating from the bulk or mass of pieces all those above or below a certain diameter, then scratching or abrading, as by sharp pins, the pieces so separated, in order to detach and remove, so far as possible, the adhering leaves and sheaths, and then brushing the pieces so treated to remove any remaining adherent portions and polish the surfaces. I may carry out this process as already described by separating the pieces into two or more sizes of different diameters, and then delivering the pieces of each size, respectively, into scratching and brushing apparatus. I may effect the separation into the several sizes, as herein set forth, successively, and scratch and brush the separated pieces, the pieces of each size, in an apparatus adapted thereto, the series of apparatus operating simultaneously.

I claim as my invention—

1. The process of stripping sugar-cane, which consists, first, in dividing said cane into short lengths; second, assorting the said lengths to separate therefrom all pieces of a diameter exceeding a certain limit; third, subjecting said last-mentioned pieces to scratching or abrasion, whereby the leaves and sheaths thereon are loosened or removed, and, fourth, subjecting said last-mentioned pieces to brushing, whereby any remaining adherent matter is removed and the surface of the cane smoothed and polished, substantially as described.

2. The process of stripping sugar-cane, which consists, first, in dividing said cane into short lengths; second, assorting the said lengths with reference to their diameters into two or more sizes; third, subjecting the pieces of each size to scratching or abrasion in devices respectively adapted to each size, whereby the leaves and sheaths thereon are loosened or removed, and, fourth, subjecting the pieces of each size to brushing in devices respectively adapted to each size, whereby any remaining adherent matter is removed and the surface of the cane smoothed and polished, substantially as described.

3. The process of stripping sugar-cane, which consists, first, in dividing said cane into short lengths; second, assorting said lengths with reference to their diameters into two or more sizes, the said sizes being assorted successively; third, simultaneously subjecting the pieces of each size to scratching or abrasion in devices respectively adapted to each size, whereby the leaves and sheaths are loosened or removed, and, fourth, simultaneously subjecting the pieces of each size to brushing in devices respectively adapted to each size, whereby any remaining adherent matter is removed and the surface of the cane smoothed and polished, substantially as described.

HENRY A. HUGHES.

Witnesses:
 EDW. J. STRAIN,
 GEO. C. POTTS.